US012128943B2

(12) United States Patent
Yuan et al.

(10) Patent No.: US 12,128,943 B2
(45) Date of Patent: Oct. 29, 2024

(54) FRAME FOLDING MECHANISM, FRAME LOCKING MECHANISM, BACKREST UNLOCKING MECHANISM AND STROLLER

(71) Applicant: WONDERLAND SWITZERLAND AG, Steinhausen (CH)

(72) Inventors: Jialiang Yuan, Guangdong (CN); Zhengwen Guo, Guangdong (CN)

(73) Assignee: WONDERLAND SWITZERLAND AG, Steinhausen (CH)

( * ) Notice: Subject to any disclaimer, the term of this patent is extended or adjusted under 35 U.S.C. 154(b) by 107 days.

(21) Appl. No.: 17/791,802

(22) PCT Filed: Dec. 29, 2020

(86) PCT No.: PCT/EP2020/087956
§ 371 (c)(1),
(2) Date: Jul. 8, 2022

(87) PCT Pub. No.: WO2021/140045
PCT Pub. Date: Jul. 15, 2021

(65) Prior Publication Data
US 2023/0042740 A1     Feb. 9, 2023

(30) Foreign Application Priority Data
Jan. 10, 2020 (CN) .......................... 202010029319.2

(51) Int. Cl.
*B62B 7/06* (2006.01)
*B62B 9/08* (2006.01)

(52) U.S. Cl.
CPC .............. *B62B 7/062* (2013.01); *B62B 9/085* (2013.01); *B62B 2205/20* (2013.01)

(58) Field of Classification Search
CPC ........... B62B 7/062; B62B 7/06; B62B 9/085; B62B 9/08; B62B 2205/20; B62B 2205/22; B62B 2205/23; B62B 2205/24
See application file for complete search history.

(56) References Cited

U.S. PATENT DOCUMENTS 7,632,035 B2 * 12/2009 Cheng ....................... B62B 7/08
403/98
8,485,547 B2 * 7/2013 Hsu ........................ B62B 7/062
280/658

(Continued)

FOREIGN PATENT DOCUMENTS

| CN | 101282865 A | 10/2008 |
|---|---|---|
| CN | 203558113 U | 4/2014 |

(Continued)

OTHER PUBLICATIONS

Mechanical translation of CN104828120, Aug. 12, 2015.*

(Continued)

*Primary Examiner* — John D Walters
(74) *Attorney, Agent, or Firm* — Volpe Koenig

(57) ABSTRACT

The invention provides a frame folding mechanism, a frame locking mechanism, a backrest unlocking mechanism and a stroller. A handle, a front foot, a seat portion and a linking member of the frame folding mechanism form a planar linkage mechanism. The handle and the front foot can be driven to rotate and fold toward a rear foot, so as to drive the seat portion to rotate and fold. The frame locking mechanism can drive a sliding member and a frame expansion locking member to slide by an unlock driving mechanism, such that the frame expansion locking member disengages from a handle locking hole and a front foot locking hole to unlock a frame. The backrest unlocking mechanism has a backrest locking member. The unlock driving mechanism can drive the backrest locking member to slide, such that the (Continued)

backrest locking member disengages from a backrest portion to unlock the backrest portion.

22 Claims, 13 Drawing Sheets

(56) References Cited

U.S. PATENT DOCUMENTS

| | | | |
|---|---|---|---|
| 9,908,551 B2* | 3/2018 | Ransil | B62B 9/102 |
| 2012/0032419 A1 | 2/2012 | Li | |
| 2016/0046314 A1 | 2/2016 | Zehfuss | |
| 2017/0313337 A1 | 11/2017 | Horst | |

FOREIGN PATENT DOCUMENTS

| | | | |
|---|---|---|---|
| CN | 204161429 U | | 2/2015 |
| CN | 104828120 A | * | 8/2015 |
| CN | 106541977 A | | 3/2017 |
| CN | 206437044 U | | 8/2017 |
| CN | 206456426 U | | 9/2017 |
| CN | 107380241 A | | 11/2017 |
| CN | 107640205 A | | 1/2018 |
| CN | 207106591 U | | 3/2018 |
| CN | 110325427 A | | 10/2019 |
| DE | 9400177 U1 | | 4/1994 |
| DE | 202014102891 U1 | | 8/2014 |
| GB | 2544377 A | | 5/2017 |
| JP | 2007537911 A | | 12/2007 |
| TW | 590091 | | 6/2004 |
| TW | M359453 U | | 6/2009 |
| TW | 201711890 A | | 4/2017 |
| WO | 2005108181 A2 | | 11/2005 |

OTHER PUBLICATIONS

Office Action issued in corresponding Japanese Application No. 2022-542434 dated Aug. 7, 2023. English Translation Included.
Taiwanese Office Action for Application No. 112101714 dated Mar. 30, 2023.
Office Action issued in corresponding Taiwanese Patent Application No. 110100427 on Feb. 14, 2022, consisting of 10 pp.
International Search Report mailed in corresponding International Patent Application No. PCT/EP2020/087956 on Jul. 5, 2021, consisting of 6 pp.
Written Opinion mailed in corresponding International Patent Application No. PCT/EP2020/087956 on Jul. 5, 2021, consisting of 9 pp.
Office Action issued in corresponding Chinese Patent Application No. 202010029319.2 on Dec. 3, 2021, consisting of 26 pp. (English Abstract Provided).

* cited by examiner

FRAME FOLDING MECHANISM, FRAME LOCKING MECHANISM, BACKREST UNLOCKING MECHANISM AND STROLLER

CROSS-REFERENCE TO RELATED APPLICATIONS

This application is a 371 National Phase of International Application No. PCT/EP2020/087956, filed on Dec. 29, 2020, which claims priority from Chinese Patent Application No. 202010029319.2, filed on Jan. 10, 2020, the entire content of which is incorporated herein by reference.

TECHNICAL FIELD

The present invention relates to a baby product, particularly a frame folding mechanism, a frame locking mechanism, a backrest unlocking mechanism and a stroller.

BACKGROUND

As strollers are in widespread use, people have higher and higher functional requirements for strollers. People not only hope that the stroller will make the baby feel comfortable and safe when in use, but also hope that the stroller can be folded into a smaller volume when not in use, so as to achieve the effects of beautiful appearance, space saving and convenient storage.

The conventional stroller usually includes a frame, a backrest and a seat portion, wherein the backrest and the seat portion are disposed on the frame. When folding the stroller, it is usually necessary to separately operate the frame, the backrest and the seat portion, such that the frame, the backrest and the seat portion can be folded. The folding operation of the aforesaid stroller is complicated and inconvenient.

SUMMARY

The present invention aims at providing a frame folding mechanism capable of folding a frame and a seat portion of a stroller in linkage.

The present invention further aims at providing a stroller with a frame folding mechanism, wherein the frame folding mechanism is capable of folding a frame and a seat portion of the stroller in linkage.

The present invention further aims at providing a frame locking mechanism with simple structure and capable of locking and unlocking a frame.

The present invention further aims at providing a stroller with a frame locking mechanism, wherein the frame locking mechanism is capable of locking a frame.

The present invention further aims at providing a backrest unlocking mechanism with simple structure and capable of unlocking a backrest.

The present invention further aims at providing a stroller with a backrest unlocking mechanism, wherein the backrest unlocking mechanism is capable of unlocking a backrest.

As will be seen more clearly from the detailed description following below, the claimed frame folding mechanism includes a frame, a seat portion and a linking member. The frame includes a handle, a front foot and a rear foot. The handle, the front foot and the rear foot are coaxially and pivotally connected to each other to form a first rotation center. The front foot is pivotally connected to the seat portion to form a second rotation center. An end of the linking member is pivotally connected to the seat portion to form a third rotation center. Another end of the linking member is pivotally connected to the handle to form a fourth rotation center. The first rotation center, the second rotation center, the third rotation center and the fourth rotation center are distributed separately. The frame rotates and folds, such that the linking member drives the seat portion to rotate and fold.

Compared to the prior art, the handle, the front foot and the rear foot of the frame folding mechanism of the invention are coaxially and pivotally connected to each other, the front foot is pivotally connected to the seat portion, and the linking member is pivotally connected between the seat portion and the handle, such that the handle, the front foot, the seat portion and the linking member form a planar linkage mechanism. Accordingly, the handle and the front foot can be driven to rotate and fold toward the rear foot, so as to drive the seat portion to rotate and fold. Therefore, the frame folding mechanism of the invention can fold the frame and the seat portion in linkage. The operation is simple and convenient, such that the invention is suitable for widespread promotion.

As will be seen more clearly from the detailed description following below, the claimed stroller includes the aforesaid frame folding mechanism. A plurality of wheels are pivotally connected to a bottom of the front foot and a bottom of the rear foot.

Compared to the prior art, the stroller of the invention has the frame folding mechanism, wherein the handle, the front foot and the rear foot of the frame folding mechanism are coaxially and pivotally connected to each other, the front foot is pivotally connected to the seat portion, and the linking member is pivotally connected between the seat portion and the handle, such that the handle, the front foot, the seat portion and the linking member form a planar linkage mechanism. Accordingly, the handle and the front foot can be driven to rotate and fold toward the rear foot, so as to drive the seat portion to rotate and fold. Therefore, the stroller of the invention can fold the frame and the seat portion in linkage. The operation is simple and convenient, such that the invention is suitable for widespread promotion.

As will be seen more clearly from the detailed description following below, the claimed frame locking mechanism includes a frame, a sliding member, a frame expansion locking member and an unlock driving mechanism. The frame includes a handle, a front foot and a rear foot. The handle has a handle locking hole. The front foot has a front foot locking hole. The sliding member is slidably disposed in the rear foot. The frame expansion locking member is disposed on the sliding member. The frame expansion locking member engages in the handle locking hole and the front foot locking hole. The unlock driving mechanism is connected to the sliding member. The unlock driving mechanism drives the sliding member and the frame expansion locking member to slide together, such that the frame expansion locking member disengages from the handle locking hole and the front foot locking hole to unlock the frame.

Compared to the prior art, the handle of the frame locking mechanism of the invention has the handle locking hole, the front foot has the front foot locking hole, and the frame expansion locking member engages in the handle locking hole and the front foot locking hole, so as to lock the handle and the front foot, such that the handle and the front foot cannot rotate and fold toward the rear foot. Consequently, the frame is locked. The unlock driving mechanism can drive the sliding member and the frame expansion locking member to slide together, such that the frame expansion locking member disengages from the handle locking hole and the front foot locking hole to unlock the frame. Accordingly, the handle and the front foot can rotate and fold toward the rear foot. Therefore, the frame locking mechanism of the invention can lock and unlock the frame, the structure is simple, and the manufacturing cost is low.

As will be seen more clearly from the detailed description following below, the claimed stroller includes the aforesaid frame locking mechanism.

Compared to the prior art, the stroller of the invention has the frame locking mechanism, wherein the handle of the frame locking mechanism has the handle locking hole, the front foot has the front foot locking hole, and the frame expansion locking member engages in the handle locking hole and the front foot locking hole, so as to lock the handle and the front foot, such that the handle and the front foot cannot rotate and fold toward the rear foot. Consequently, the frame is locked. The unlock driving mechanism can drive the sliding member and the frame expansion locking member to slide together, such that the frame expansion locking member disengages from the handle locking hole and the front foot locking hole to unlock the frame. Accordingly, the handle and the front foot can rotate and fold toward the rear foot. Therefore, the stroller of the invention can lock and unlock the frame, the structure is simple, and the manufacturing cost is low.

As will be seen more clearly from the detailed description following below, the claimed backrest unlocking mechanism includes a frame, a backrest portion, a backrest locking member and an unlock driving mechanism. The backrest portion is pivotally connected to the frame. The backrest locking member is engaged between the frame and the backrest portion. The unlock driving mechanism is connected to the backrest locking member. The unlock driving mechanism drives the backrest locking member to slide, such that the backrest locking member disengages from the backrest portion to unlock the backrest portion. Compared to the prior art, the backrest unlocking mechanism of the invention has the backrest locking member. The backrest locking member is engaged between the frame and the backrest portion, so as to lock the backrest on the frame. Since the unlock driving mechanism is connected to the backrest locking member, the unlock driving mechanism can drive the backrest locking member to slide, such that the backrest locking member disengages from the backrest portion to unlock the backrest portion. Accordingly, the backrest portion can rotate and fold with respect to the frame, the structure is simple, and the manufacturing cost is low.

As will be seen more clearly from the detailed description following below, the claimed the stroller includes the aforesaid backrest unlocking mechanism.

Compared to the prior art, the stroller of the invention has the backrest unlocking mechanism, wherein the backrest unlocking mechanism has the backrest locking member. The backrest locking member is engaged between the frame and the backrest portion, so as to lock the backrest on the frame. Since the unlock driving mechanism is connected to the backrest locking member, the unlock driving mechanism can drive the backrest locking member to slide, such that the backrest locking member disengages from the backrest portion to unlock the backrest portion. Accordingly, the backrest portion can rotate and fold with respect to the frame, the structure is simple, and the manufacturing cost is low.

BRIEF DESCRIPTION OF THE DRAWINGS

In the following, the invention is further illustrated by way of example, taking reference to the accompanying drawings thereof.

DETAILED DESCRIPTION

Figure 1:
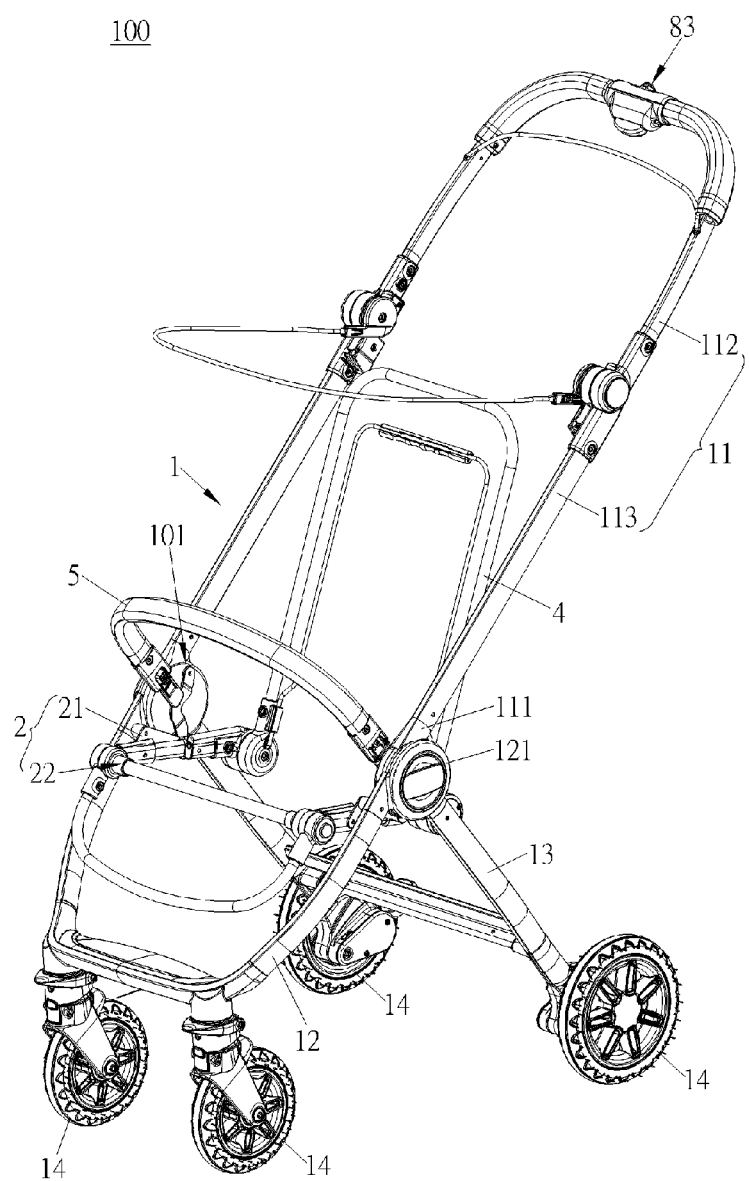
FIG. 1 is a schematic view illustrating a stroller of the invention from a first angle.

In order to explain the disclosure and structural features in detail, the invention will be further described with the embodiments and drawings in the following.

As shown in FIGS. 1 to 5 and 8, a stroller 100 of the invention includes a frame 1, a seat portion 2, a backrest portion 4, a handrail portion 5, a frame folding mechanism 101, a frame locking mechanism 102 and a backrest unlocking mechanism 103. The seat portion 2 is disposed on the frame 1 and used for a baby to ride. The backrest portion 4 is disposed on the seat portion 2 and used for the baby to lean on. The frame folding mechanism 101 is disposed between the frame 1 and the seat portion 2. The frame folding mechanism 101 is used for folding the frame 1 and the seat portion 2 in linkage. The frame locking mechanism 102 is disposed in the frame 1. The frame locking mechanism 102 is used for locking or unlocking the frame 1. The backrest unlocking mechanism 103 is disposed between the backrest portion 4 and the seat portion 2 and used for unlocking the backrest portion 4, such that the backrest portion 4 can rotate and fold.

Figure 2:
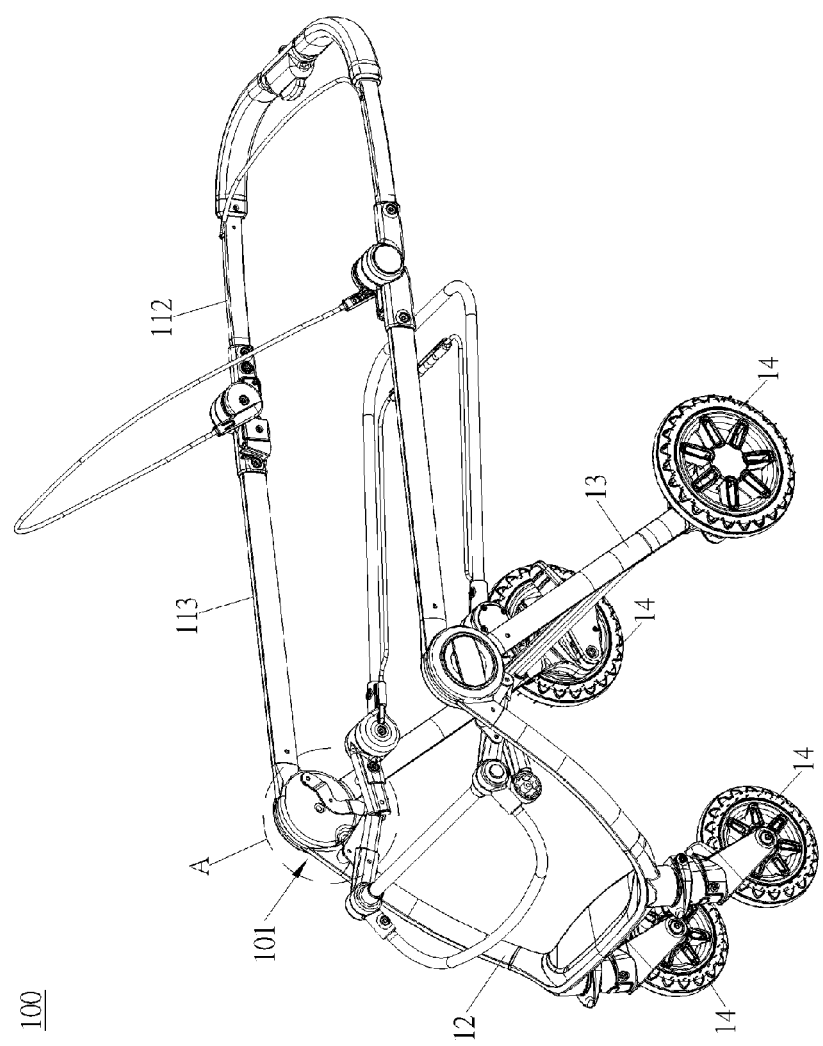
FIG. 2 is a schematic view illustrating a stroller of the invention while being folded.
Figure 3:
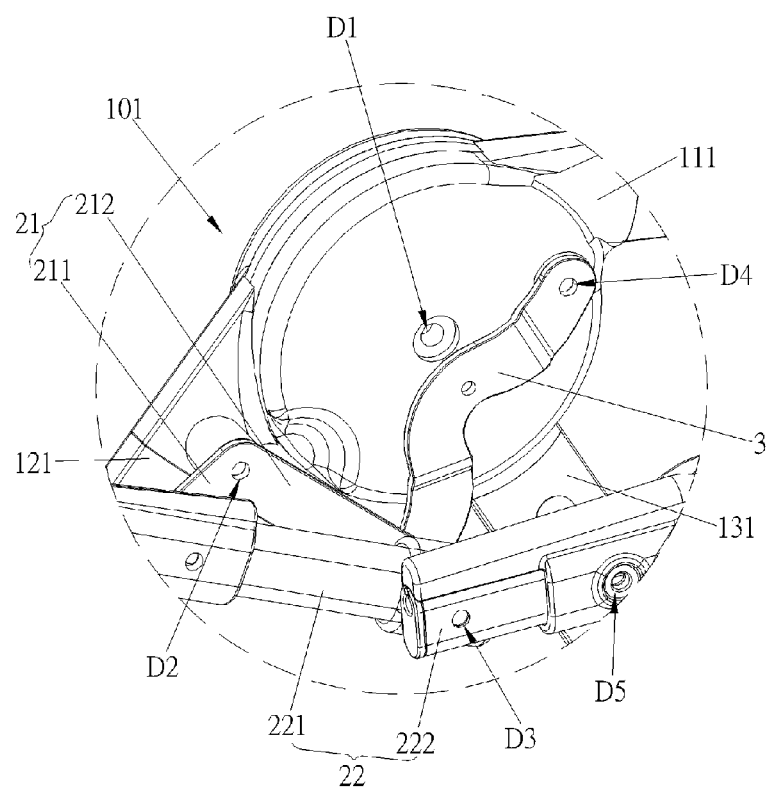
FIG. 3 is an enlarged view illustrating a region A shown in FIG. 2.

As shown in FIGS. 1 to 3, the frame folding mechanism 101 includes a linking member 3. The frame 1 includes a handle 11, a front foot 12 and a rear foot 13. The handle 11, the front foot 12 and the rear foot 13 are coaxially and pivotally connected to each other to form a first rotation center D1. The front foot 12 is pivotally connected to the seat portion 2 to form a second rotation center D2. An end of the linking member 3 is pivotally connected to the seat portion 2 to form a third rotation center D3. Another end of the linking member 3 is pivotally connected to the handle 11 to form a fourth rotation center D4. The first rotation center D1, the second rotation center D2, the third rotation center D3 and the fourth rotation center D4 are distributed separately. The frame 1 rotates and folds, such that the linking member 3 drives the seat portion 2 to rotate and fold. As shown in FIG. 3, D1 represents the first rotation center formed by the coaxial and pivotal connection between the handle 11, the front foot 12 and the rear foot 13, D2 represents the second rotation center formed by the pivotal connection between the front foot 12 and the seat portion 2, D3 represents the third rotation center formed by the pivotal connection between the linking member 3 and the seat portion 2, and D4 represents the fourth rotation center formed by the pivotal connection between the linking member 3 and the handle 11. The handle 11, the front foot 12, the seat portion 2 and the linking member 3 form a planar linkage mechanism, such that the handle 11 and the front foot 12 can be driven to rotate and fold toward the rear foot 13, so as to drive the seat portion 2 to rotate and fold. Accordingly, when the frame 1 rotates and folds, the seat portion 2 can fold in linkage simultaneously. Similarly, when the seat portion 2 rotates and folds, the frame 1 can also fold in linkage simultaneously. The folding manner is not limited to the aforesaid embodiment. Specifically, a handle cover 111 is disposed on an end of the handle 11, a front foot cover 121 is disposed on an end of the front foot 12, and a rear foot cover 131 is disposed on an end of the rear foot 13. The handle cover 111, the front foot cover 121 and the rear foot cover 131 are coaxially and pivotally connected to each other to form the first rotation center D1. The rear foot cover 131 is located between the front foot cover 121 and the handle cover 111. The linking member 3 is pivotally connected to the handle cover 111 and deviates from the first rotation center D1.

As shown in FIGS. 2 and 3, in this embodiment, the seat portion 2 includes a seat folding driving member 21 and a seat body 22. An end of the seat folding driving member 21 is pivotally connected to the front foot 12. The rotation center between the seat folding driving member 21 and the front foot 12 is the second rotation center D2. Another end of the seat folding driving member 21 is pivotally connected to the linking member 3. The rotation center between the seat folding driving member 21 and the linking member 3 is the third rotation center D3. The seat body 22 is fixedly connected to the seat folding driving member 21. Specifically, the seat folding driving member 21 includes a first folding driving portion 211 and a second folding driving portion 212 bent and extended from an end of the first folding driving portion 211. The seat body 22 is connected to the first folding driving portion 211 and the second folding driving portion 212. A bending portion between the first folding driving portion 211 and the second folding driving portion 212 is pivotally connected to the front foot 12. Furthermore, the seat body 22 includes a front seat tube portion 221 and a rear seat tube portion 222. The front seat tube portion 221 is connected between the first folding driving portion 211 and the second folding driving portion 212. The front seat tube portion 221 is pivotally connected to the rear seat tube portion 222. When the handle 11 and the front foot 12 rotate and fold toward the rear foot 13, the seat folding driving member 21 drives the front seat tube portion 221 of the seat body 22 to rotate and fold with respect to the rear seat tube portion 222. More specifically, a pivot between the seat folding driving member 21 and the linking member 3 is identical to a pivot between the rear seat tube portion 222 and the front seat tube portion 221. That is to say, the rotation center between the rear seat tube portion 222 and the front seat tube portion 221 is also the third rotation center D3. Still further, the rear seat tube portion 222 is pivotally connected to the rear foot 13 to form a fifth rotation center D5. The fifth rotation center D5 and the first rotation center D1 are distributed separately. As shown in FIG. 3, D5 represents the rotation center between the rear seat tube portion 222 and the rear foot 13. When the handle 11 and the front foot 12 rotate and fold toward the rear foot 13, the seat folding driving member 21 and the linking member 3 assist the front seat tube portion 221 and the rear seat tube portion 222 of the seat body 22 in rotating and folding toward to each other, so as to fold the entire seat portion 2.

As shown in FIG. 1, in this embodiment, the handle 11 includes an upper handle portion 112 and a lower handle portion 113. The upper handle portion 112 is pivotally connected to the lower handle portion 113. The front foot 12, the rear foot 13 and the lower handle portion 113 are coaxially and pivotally connected to each other to form the first rotation center D1. The upper handle portion 112 can rotate and fold toward the lower handle portion 113 to fold the handle 11.

As shown in FIG. 1, in this embodiment, the handrail portion 5 is fixedly connected to the linking member 3. When the handle 11 and the front foot 12 of the frame 1 rotate and fold toward the rear foot 13, the linking member 3 can be driven to swing, so as to drive the handrail portion 5 to rotate and fold by the linking member 3. Specifically, a plurality of wheels 14 are pivotally connected to a bottom of the front foot 12 and a bottom of the rear foot 13.

Figure 11:
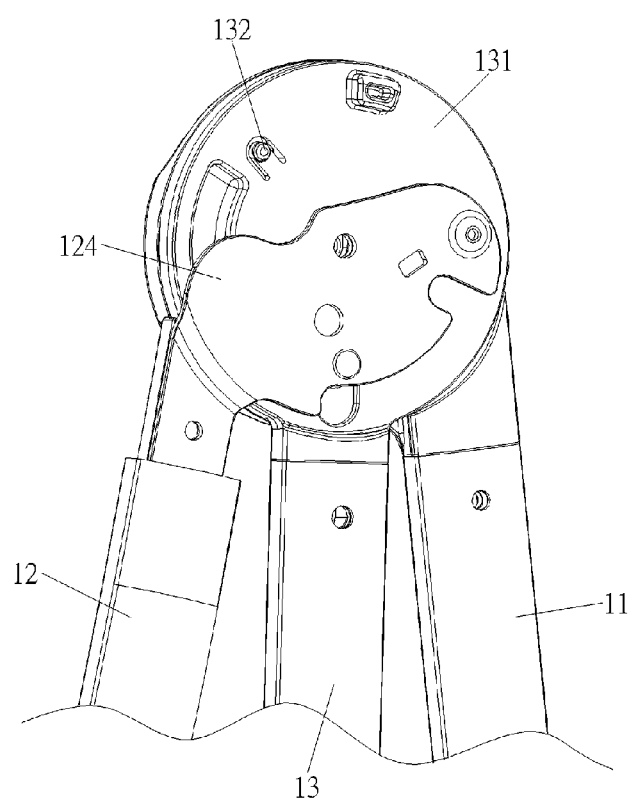
FIG. 11 is a schematic view illustrating a handle, a front foot and a rear foot of the invention.
Figure 12:
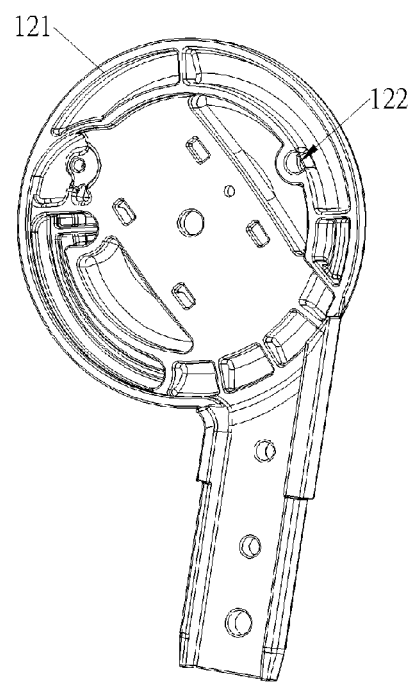
FIG. 12 is a schematic view illustrating a front foot cover of the invention.
Figure 13:
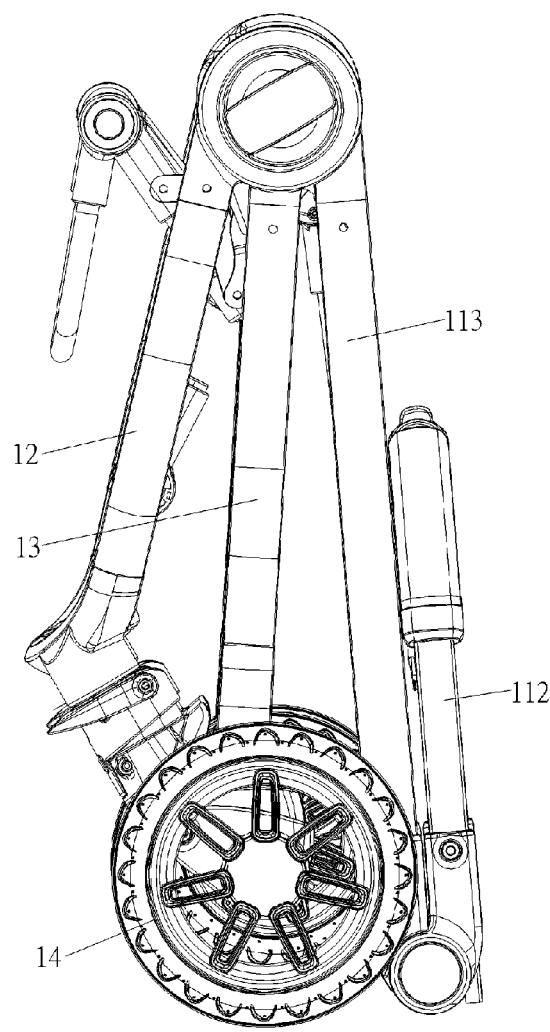
FIG. 13 is a schematic view illustrating a stroller of the invention after being folded.

As shown in FIGS. 11 to 13, in this embodiment, the rear foot cover 131 of the rear foot 13 has an elastic protrusion 132 and the front foot cover 121 of the front foot 12 has an engaging recess 122. The frame 1 rotates to fold or expand, such that the elastic protrusion 132 engages with or disengages from the engaging recess 122. After the front foot 12 of the frame 1 rotates and folds toward the rear foot 13, the elastic protrusion 132 on the rear foot cover 131 engages with the engaging recess 122 on the front foot cover 121, so as to lock the front foot 12 and the rear foot 13 and then lock the frame 1. When the frame 1 needs to be expanded, the user can operate the front foot 12 to rotate and expand with respect to the rear foot 13 since the elastic protrusion 132 is elastic. During the aforesaid process, the elastic protrusion 132 of the rear foot cover 131 is forced to disengage from the engaging recess 122 of the front foot cover 121, so as to unlock the front foot 12 and the rear foot 13.

Figure 4:
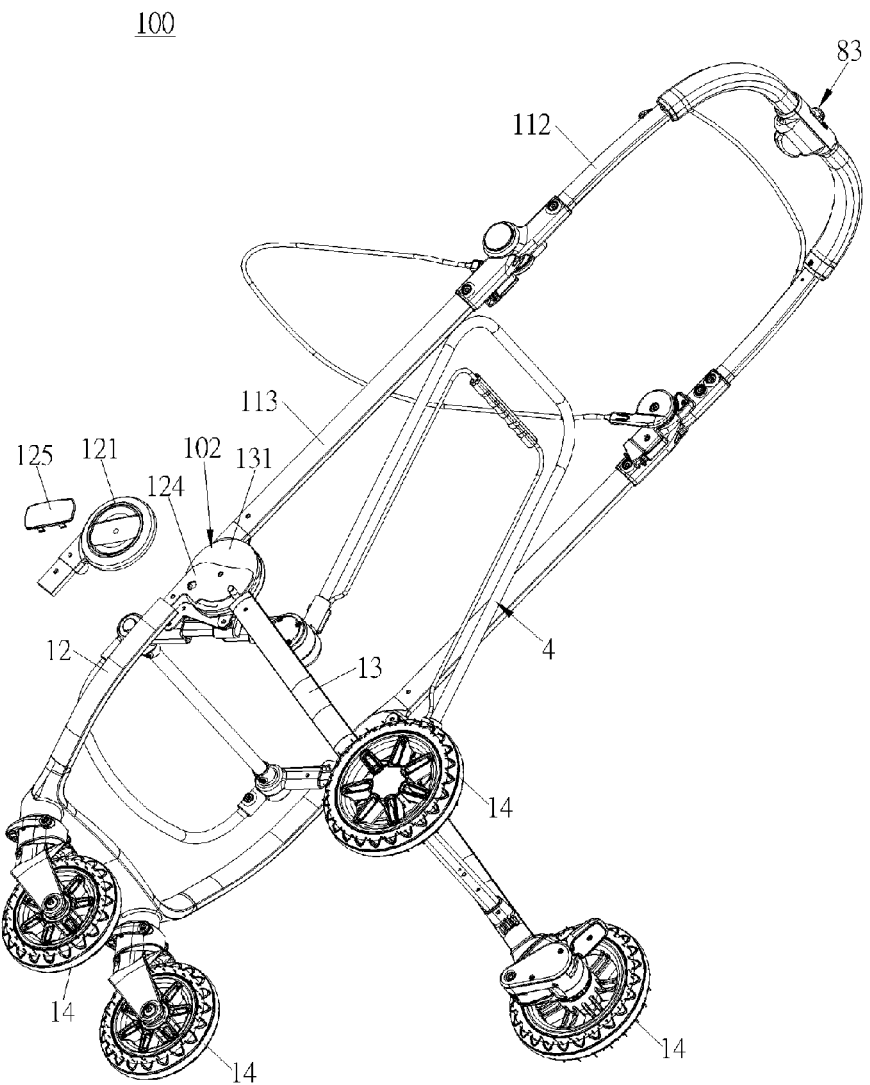
FIG. 4 is a schematic view illustrating a front foot cover detached from a stroller of the invention.
Figure 5:
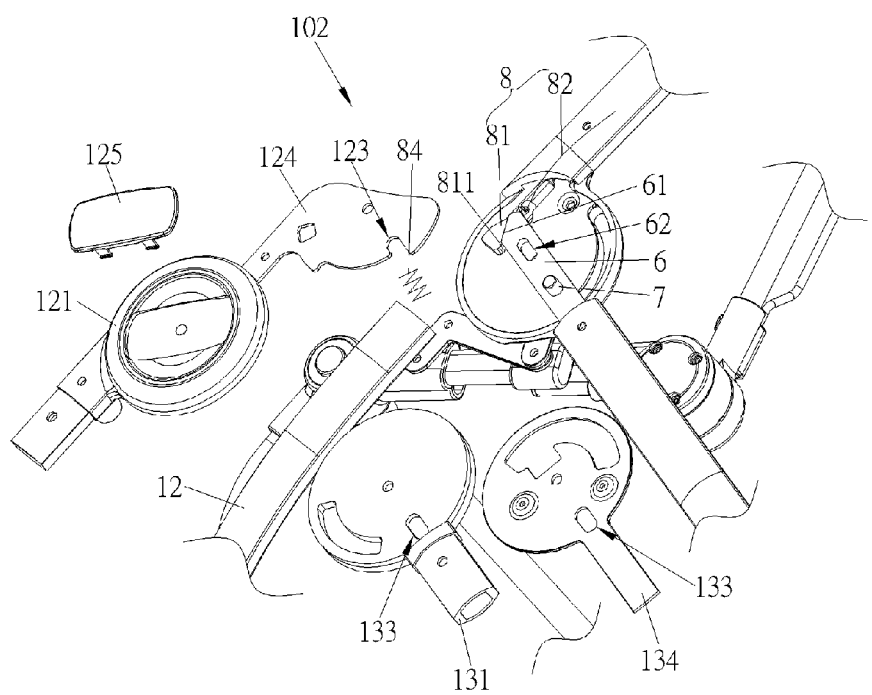
FIG. 5 is a schematic view illustrating a frame locking mechanism of a stroller of the invention.
Figure 6:
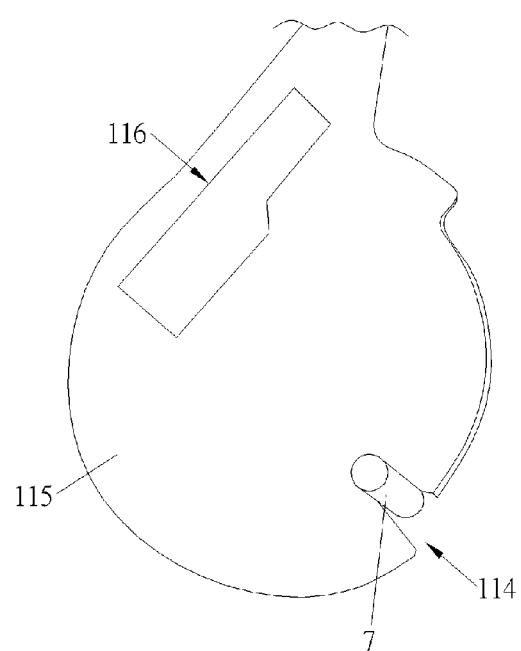
FIG. 6 is a schematic view illustrating a handle connecting member of a stroller of the invention.
Figure 7:
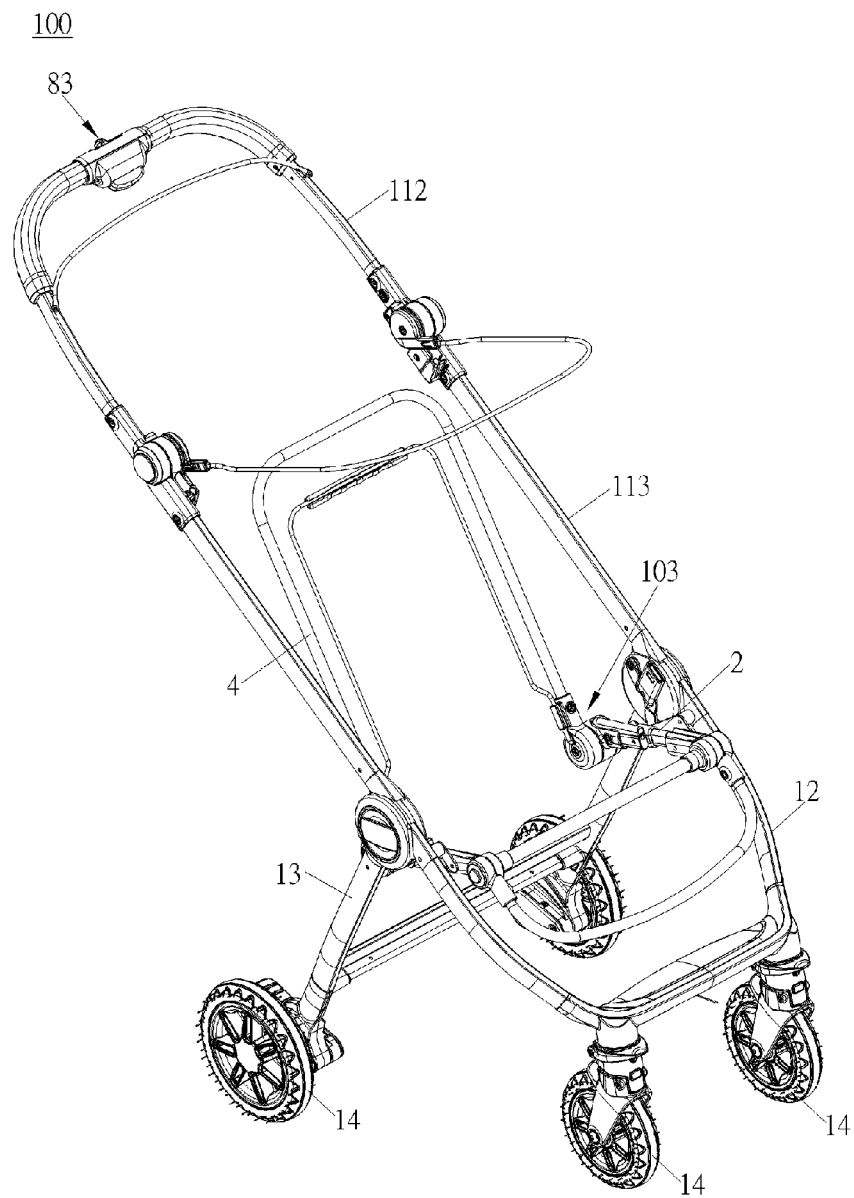
FIG. 7 is a schematic view illustrating a stroller of the invention from a second angle.

As shown in FIGS. 4 to 6, the frame locking mechanism 102 includes a sliding member 6, a frame expansion locking member 7 and an unlock driving mechanism 8. The handle cover 111 of the handle 11 has a handle locking hole 114. The front foot cover 121 of the front foot 12 has a front foot locking hole 123. The sliding member 6 is slidably disposed in the rear foot 13. The frame expansion locking member 7 is disposed on the sliding member 6. The frame expansion locking member 7 engages in the handle locking hole 114 and the front foot locking hole 123. The sliding member 6 has a slot 62 for receiving a pivot between the handle 11, the front foot 12 and the rear foot 13. The unlock driving mechanism 8 is connected to the sliding member 6. The unlock driving mechanism 8 drives the sliding member 6 and the frame expansion locking member 7 to slide together, such that the frame expansion locking member 7 disengages from the handle locking hole 114 and the front foot locking hole 123 to unlock the frame 1. Specifically, the handle 11 has a handle connecting member 115, the handle connecting member 115 is fixedly connected to the handle cover 111, and the handle locking hole 114 is formed on the handle connecting member 115. The handle connecting member 115 and the handle cover 111 are parts of the handle 11. The front foot 12 has a front foot connecting member 124, the front foot connecting member 124 is fixedly connected to the front foot cover 121, and the front foot locking hole 123 is formed on the front foot connecting member 124. A decorative cover 125 is connected to an outside of the front foot cover 121. The front foot connecting member 124 and the front foot cover 121 are parts of the front foot 12. The rear foot 13 has a rear foot connecting member 134 and the rear foot connecting member 134 is fixedly connected to the rear foot cover 131. The rear foot connecting member 134 has a restraining groove 133 and the frame expansion locking member 7 is slidably disposed in the restraining groove 133. The rear foot connecting member 134 and the rear foot cover 131 are parts of the rear foot 13.

As shown in FIGS. 4 to 6, in this embodiment, the unlock driving mechanism 8 includes an unlock driving member 81 and a first dragging member 82. The unlock driving member 81 is slidably disposed on the handle connecting member 115 of the handle 11, but the invention is not so limited. In another embodiment, the unlock driving member 81 may also be slidably disposed on other positions of the handle 11. The unlock driving member 81 has a first inclined surface 811 and the sliding member 6 has a second inclined surface 61, wherein the first inclined surface 811 abuts against the second inclined surface 61. The first dragging member 82 is connected to the unlock driving member 81. The first dragging member 82 pulls the unlock driving member 81 to slide, so as to drive the sliding member 6 and the frame expansion locking member 7 to slide together by the cooperation between the first inclined surface 811 and the second inclined surface 61. Accordingly, the frame expansion locking member 7 disengages from the handle locking hole 114 and the front foot locking hole 123 to unlock the frame 1, such that the handle 11 and the front foot 12 can rotate and fold toward the rear foot 13. However, the unlock driving mechanism 8 is not limited to the aforesaid structure. For example, the unlock driving mechanism 8 may only include the unlock driving member 81. An end of the unlock driving member 81 protrudes from the handle 11. The unlock driving member 81 may be directly driven to slide, so as to drive the sliding member 6 and the frame expansion locking member 7 to slide together. Specifically, the handle connecting member 115 of the handle 11 has a sliding groove 116 and the unlock driving member 81 is slidably disposed in the sliding groove 116. The first dragging member 82 pulls the unlock driving member 81 to slide along the sliding groove 116. At the same time, the sliding groove 116 may restrain the unlock driving member 81. Furthermore, the unlock driving mechanism 8 further includes an unlock operating mechanism 83. The unlock operating mechanism 83 is disposed on the handle 11. The first dragging member 82 is connected to the unlock operating mechanism 83. The unlock operating mechanism 83 is operated to pull the first dragging member 82. Since the unlock operating mechanism 83 is well known in the art, it will not be depicted herein.

As shown in FIGS. 4 to 6, the unlock driving mechanism 8 further includes a first elastic member 84 for returning the frame expansion locking member 7. The first elastic member 84 is disposed between the rear foot 13 and one of the frame expansion locking member 7 and the sliding member 6. In this embodiment, the first elastic member 84 is disposed between the rear foot 13 and the sliding member 6. When the unlock operating mechanism 83 pulls the first dragging member 82, the first dragging member 82 pulls the unlock driving member 81 to slide along the sliding groove 116, so as to drive the sliding member 6 to slide. The sliding member 6 compresses the first elastic member 84. When the unlock operating mechanism 83 is released, the sliding member 6 returns by an elastic force of the first elastic member 84. However, the position of the first elastic member 84 is not limited to the aforesaid embodiment.

As shown in FIGS. 7 to 10, the backrest unlocking mechanism 103 includes a backrest locking member 9. The backrest portion 4 is pivotally connected to the frame 1. Specifically, backrest portion 4 is pivotally connected to the seat portion 2 on the frame 1. The backrest locking member 9 is engaged between the frame 1 and the backrest portion 4. The unlock driving mechanism 8 is connected to the backrest locking member 9. The unlock driving mechanism 8 drives the backrest locking member 9 to slide, such that the backrest locking member 9 disengages from the backrest portion 4 to unlock the backrest portion 4. At this time, the backrest locking member 9 is still engaged with the seat portion 2 of the frame 1.

As shown in FIGS. 7 to 10, in this embodiment, the seat portion 2 on the frame 1 has a positioning member 23. The backrest portion 4 is pivotally connected to the positioning member 23. The backrest locking member 9 is engaged between the positioning member 23 and the backrest portion 4. The positioning member 23 is fixedly connected to the rear seat tube portion 222 of the seat portion 2. Specifically, a first inner gear 231 is disposed inside the positioning member 23, a second inner gear 421 is disposed inside the backrest portion 4, and the backrest locking member 9 has an outer gear 91, wherein the outer gear 91 meshes with the first inner gear 231 and the second inner gear 421. The unlock driving mechanism 8 drives the backrest locking member 9 to slide toward the first inner gear 231, such that the backrest locking member 9 disengages from the second inner gear 421 to unlock the backrest portion 4. Consequently, the backrest portion 4 can rotate and fold with respect to the seat portion 2.

Figure 8:
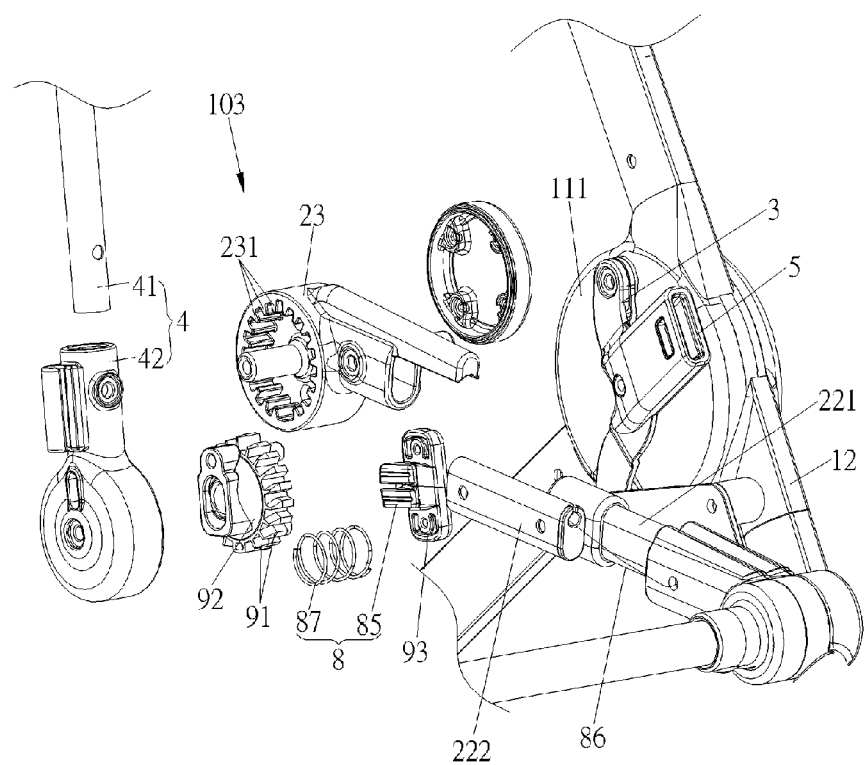
FIG. 8 is a schematic view illustrating a backrest unlocking mechanism of a stroller of the invention.
Figure 9:
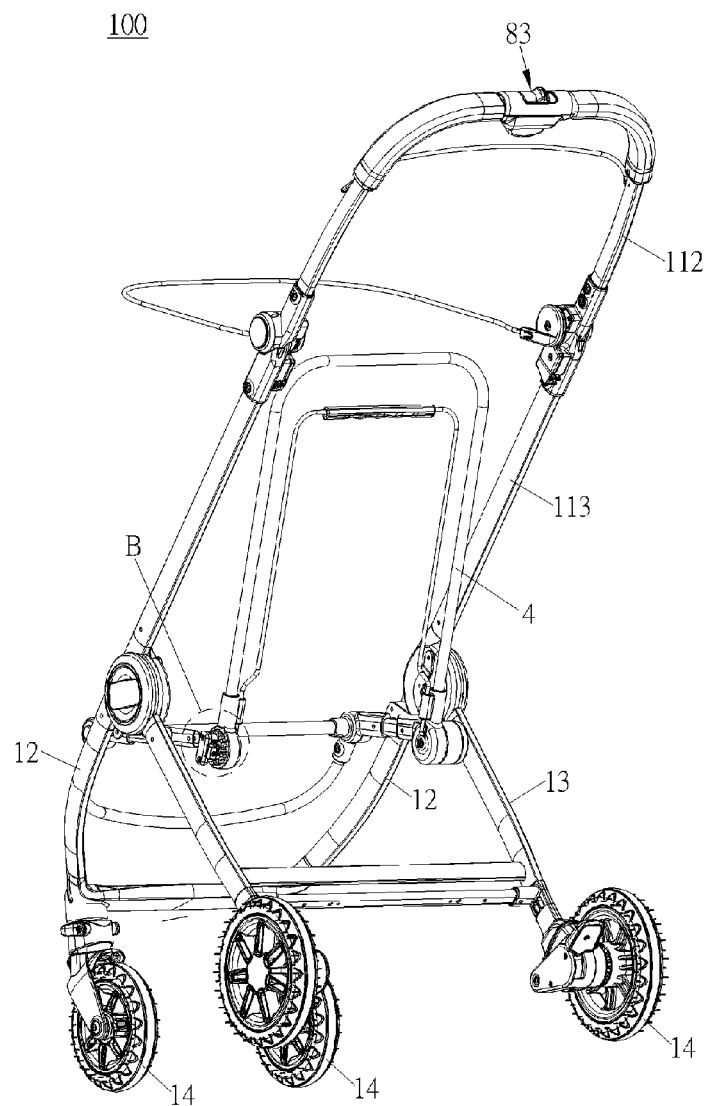
FIG. 9 is a schematic view illustrating a stroller of the invention from a third angle.
Figure 10:
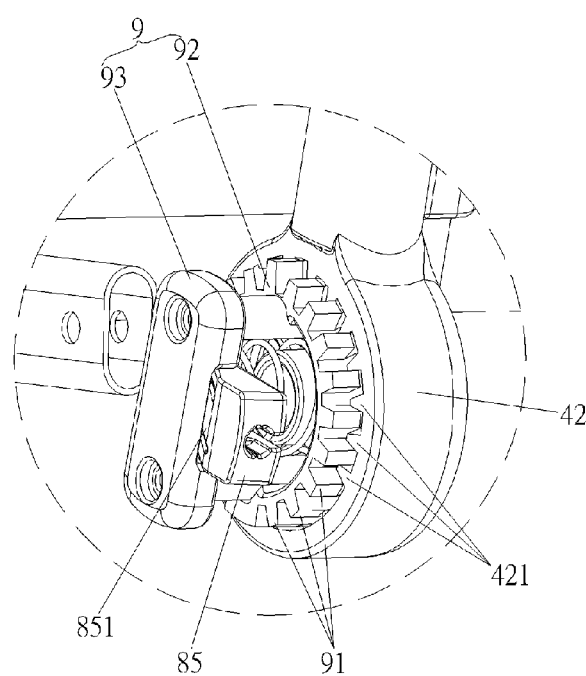
FIG. 10 is an enlarged view illustrating a region B shown in FIG. 9.

As shown in FIGS. 8 and 10, in this embodiment, the backrest portion 4 includes a backrest body 41 and a backrest fixing member 42. The backrest body 41 is fixedly connected to the backrest fixing member 42. The second inner gear 421 is disposed inside the backrest fixing member 42. The backrest fixing member 42 is pivotally connected to the positioning member 23. A pivot between the backrest fixing member 42 of the backrest portion 4 and the positioning member 23 penetrates the backrest locking member 9.

As shown in FIGS. 8 and 10, in this embodiment, the unlock driving mechanism 8 further includes a backrest folding driving member 85. The backrest folding driving member 85 abuts against the backrest locking member 9. The backrest folding driving member 85 slides to push the backrest locking member 9, such that the backrest locking member 9 moves to disengage from the backrest portion 4. Specifically, the backrest folding driving member 85 has a third inclined surface 851. The backrest locking member 9 abuts against the third inclined surface 851. The backrest folding driving member 85 drives the backrest locking member 9 to move by the third inclined surface 851, such that the backrest locking member 9 disengages from the backrest portion 4. The backrest locking member 9 may has a fourth inclined surface and the fourth inclined surface abuts against the third inclined surface 851 of the backrest folding driving member 85, but the invention is not so limited. For example, the backrest folding driving member 85 may be disposed on the backrest fixing member 42. When the backrest folding driving member 85 is pressed, the backrest folding driving member 85 pushes the backrest locking member 9 to move and disengage from the backrest portion 4. More specifically, the backrest locking member 9 includes an engaging portion 92 and a fixing portion 93. The engaging portion 92 is engaged between the frame 1 and the backrest portion 4. The engaging portion 92 is fixedly connected to the fixing portion 93. The backrest folding driving member 85 is disposed between the engaging portion 92 and the fixing portion 93. The fixing portion 93 abuts against the third inclined surface 851. The backrest folding driving member 85 can slide and push the fixing portion 93 of the backrest locking member 9, such that the fixing portion 93 and the engaging portion 92 move together. Then, the engaging portion 92 disengages from the second inner gear 421 of the backrest fixing member 42.

As shown in FIGS. 8 and 10, in this embodiment, the unlock driving mechanism 8 further includes a second dragging member 86, wherein the second dragging member 86 is connected to the backrest folding driving member 85 and capable of pulling the backrest folding driving member 85. The second dragging member 86 is pulled to pull the backrest folding driving member 85 to move. Furthermore, the unlock operating mechanism 83 is connected to the second dragging member 86. The second dragging member 86 passes through a through hole of the rear seat tube portion 222 and is connected to the backrest folding driving member 85. The unlock operating mechanism 83 is operated to pull the second dragging member 86. Specifically, the second dragging member 86 may include a steel wire and an end of the steel wire may be divided into two segments, wherein one segment is the first dragging member 82 and the other segment is the second dragging member 86. Another end of the steel wire may be operated to pull the first dragging member 82 and the second dragging member 86 simultaneously, such that the frame locking mechanism 102 unlocks the frame 1 and the backrest unlocking mechanism 103 unlocks the backrest portion 4 simultaneously. At this time, the front foot 12 and the handle 11 of the frame 1 can rotate and fold toward the rear foot 13 and drive the seat portion 2 to rotate and fold. At the same time, the backrest portion 4 can also be operated to rotate and fold, so as to fold the entire stroller 100. Still further, the unlock driving mechanism 8 further includes a second elastic member 87 for returning backrest locking member 9. The second elastic member 87 is disposed between the backrest locking member 9 and the frame 1. Specifically, the second elastic member 87 is disposed between the fixing portion 93 of the backrest locking member 9 and the positioning portion 23. When the second dragging member 86 is pulled, the second dragging member 86 pulls the backrest folding driving member 85 to push the backrest locking member 9 to move, such that the engaging portion 92 of the backrest locking member 9 moves and disengages from the second inner gear 421 of the backrest fixing member 42 and compresses the second elastic member 87. When the second dragging member 86 is released, the engaging portion 92 of the backrest locking member 9 returns by the second elastic member 87, such that the engaging portion 92 of the backrest locking member 9 engages with the second inner gear 421 again to lock the backrest portion 4. The operation of the stroller 100 of the invention will be described with reference to FIGS. 1 to 13.

When the stroller 100 needs to be folded, the unlock operating mechanism 83 is operated to pull the first dragging member 82. The first dragging member 82 pulls the unlock driving member 81 to slide along the sliding groove 116, such that the unlock driving member 81 drives the sliding member 6 to slide by the first inclined surface 811. The sliding member 6 slides to drive the frame expansion locking member to disengage from the handle locking hole 114 and the front foot locking hole 123, so as to unlock the frame 1, such that the handle 11 and the front foot 12 can rotate and fold toward the rear foot 13. When the handle 11 and the front foot 12 rotate and fold toward the rear foot 13, the seat folding driving member 21 and the linking member 3 assist the front seat tube portion 221 and the rear seat tube portion 222 of the seat body 22 in rotating and folding toward to each other, so as to fold the entire seat portion 2. When the unlock operating mechanism 83 is operated to pull the first dragging member 82, the unlock operating mechanism 83 also pulls the second dragging member 86. The second dragging member 86 pulls the backrest folding driving member 85, such that the backrest folding driving member 85 pushes the fixing portion 93 of the backrest locking member 9 to move by the third inclined surface 851. The fixing portion 93 of the backrest locking member 9 drives the engaging portion 92 to move, such that the engaging portion 92 disengages from the second inner gear 421 of the backrest fixing member 42 to unlock the backrest portion 4. Consequently, the backrest portion 4 can be operated to rotate and fold. Moreover, the upper handle portion 112 of the handle 11 can rotate and fold toward the lower handle portion 113, so as to fold the handle 11. Finally, the entire stroller 100 can rotate and fold into the state shown in FIG. 13.

As mentioned in the above, the stroller 100 of the invention has the frame folding mechanism 101, wherein the handle 11, the front foot 12 and the rear foot 13 of the frame folding mechanism 101 are coaxially and pivotally connected to each other, the front foot 12 is pivotally connected to the seat portion 2, and the linking member 3 is pivotally connected between the seat portion 2 and the handle 11, such that the handle 11, the front foot 12, the seat portion 2 and the linking member 3 form a planar linkage mechanism. Accordingly, the handle 11 and the front foot 12 can be driven to rotate and fold toward the rear foot 13, so as to drive the seat portion 2 to rotate and fold. Therefore, the stroller 100 of the invention can fold the frame 1 and the seat portion 2 in linkage. The operation is simple and convenient, such that the invention is suitable for widespread promotion. Furthermore, the stroller 100 of the invention has the frame locking mechanism 102, wherein the handle 11 of the frame locking mechanism 102 has the handle locking hole 114, the front foot 12 has the front foot locking hole 123, and the frame expansion locking member 7 engages in the handle locking hole 114 and the front foot locking hole 123, so as to lock the handle 11 and the front foot 12, such that the handle 11 and the front foot 12 cannot rotate and fold toward the rear foot 13. Consequently, the frame 1 is locked. The unlock driving mechanism 8 can drive the sliding member 6 and the frame expansion locking member 7 to slide together, such that the frame expansion locking member 7 disengages from the handle locking hole 114 and the front foot locking hole 123 to unlock the frame 1. Accordingly, the handle 11 and the front foot 12 can rotate and fold toward the rear foot 13. Therefore, the stroller 100 of the invention can lock and unlock the frame 1, the structure is simple, and the manufacturing cost is low. Moreover, the stroller 100 of the invention has the backrest unlocking mechanism 103, wherein the backrest unlocking mechanism 103 has the backrest locking member 9. The backrest locking member 9 is engaged between the frame 1 and the backrest portion 4, so as to lock the backrest on the frame 1. Since the unlock driving mechanism 8 is connected to the backrest locking member 9, the unlock driving mechanism 8 can drive the backrest locking member 9 to slide, such that the backrest locking member 9 disengages from the backrest portion 4 to unlock the backrest portion 4. Accordingly, the backrest portion 4 can rotate and fold with respect to the frame 1, the structure is simple, and the manufacturing cost is low.

The foregoing are only preferred embodiments of the invention while the protection scope thereof is not limited to the above description. Any change or substitution within the technical scope disclosed by the invention should be covered by the protection scope of the invention.

What is claimed is:

1. A frame folding mechanism comprising a frame, a seat portion and a linking member, the frame comprising a handle, a front foot and a rear foot, the handle, the front foot and the rear foot being coaxially and pivotally connected to each other to form a first rotation center, the front foot being pivotally connected to the seat portion to form a second rotation center, an end of the linking member being pivotally connected to the seat portion to form a third rotation center, another end of the linking member being pivotally connected to the handle to form a fourth rotation center, the first rotation center, the second rotation center, the third rotation center and the fourth rotation center being distributed separately, the frame rotating and folding, such that the linking member drives the seat portion to rotate and fold,
 wherein the seat portion comprises a seat folding driving member and a seat body, an end of the seat folding driving member is pivotally connected to the front foot, another end of the seat folding driving member is pivotally connected to the linking member, and the seat body is fixedly connected to the seat folding driving member.

2. The frame folding mechanism of claim 1, wherein a handle cover is disposed on an end of the handle, a front foot cover is disposed on an end of the front foot, a rear foot cover is disposed on an end of the rear foot, and the handle cover, the front foot cover and the rear foot cover are coaxially and pivotally connected to each other to form the first rotation center.

3. The frame folding mechanism of claim 2, wherein the linking member is pivotally connected to the handle cover and deviates from the first rotation center.

4. The frame folding mechanism of claim 1, wherein the seat folding driving member comprises a first folding driving portion and a second folding driving portion bent and extended from an end of the first folding driving portion, and the seat body is connected to the first folding driving portion and the second folding driving portion.

5. The frame folding mechanism of claim 1, wherein the seat body comprises a front seat tube portion and a rear seat tube portion, the front seat tube portion is connected between the first folding driving portion and the second folding driving portion, and the front seat tube portion is pivotally connected to the rear seat tube portion.

6. The frame folding mechanism of claim 5, wherein a pivot between the seat folding driving member and the linking member is identical to a pivot between the rear seat tube portion and the front seat tube portion.

7. The frame folding mechanism of claim 5, wherein the rear seat tube portion is pivotally connected to the rear foot to form a fifth rotation center, and the fifth rotation center and the first rotation center are distributed separately.

8. The frame folding mechanism of claim 1, wherein the handle comprises an upper handle portion and a lower handle portion, the upper handle portion is pivotally connected to the lower handle portion, and the front foot, the rear foot and the lower handle portion are coaxially and pivotally connected to each other to form the first rotation center.

9. The frame folding mechanism of claim 1, wherein the frame folding mechanism further comprises a backrest portion pivotally connected to the seat portion.

10. The frame folding mechanism of claim 1, wherein the frame folding mechanism further comprises a handrail portion fixedly connected to the linking member.

11. The frame folding mechanism of claim 1, wherein the rear foot is located between the front foot and the handle.

12. The frame folding mechanism of claim 1, wherein the rear foot has an elastic protrusion, the front foot has an engaging recess, and the frame rotates to fold or expand, such that the elastic protrusion engages with or disengages from the engaging recess.

13. A frame locking mechanism comprising a frame, a sliding member, a frame expansion locking member and an unlock driving mechanism, the frame comprising a handle, a front foot and a rear foot, the handle having a handle locking hole, the front foot having a front foot locking hole, the sliding member being slidably disposed in the rear foot, the frame expansion locking member being disposed on the sliding member, the frame expansion locking member engaging in the handle locking hole and the front foot locking hole, the unlock driving mechanism being connected to the sliding member, the unlock driving mechanism driving the sliding member and the frame expansion locking member to slide together, such that the frame expansion locking member disengages from the handle locking hole and the front foot locking hole to unlock the frame,
 wherein the unlock driving mechanism comprises an unlock driving member, the unlock driving member is slidably disposed on the handle, the unlock driving member abuts against the sliding member, and the unlock driving member is driven to slide to push the sliding member to slide.

14. The frame locking mechanism of claim 13, wherein the handle has a handle connecting member and the handle locking hole is formed on the handle connecting member.

15. The frame locking mechanism of claim 13, wherein the front foot has a front foot connecting member and the front foot locking hole is formed on the front foot connecting member.

16. The frame locking mechanism of claim 13, wherein the rear foot has a rear foot connecting member, the rear foot connecting member has a restraining groove, and the frame expansion locking member is slidably disposed in the restraining groove.

17. The frame locking mechanism of claim 13, wherein the handle has a sliding groove and the unlock driving member is slidably disposed in the sliding groove.

18. The frame locking mechanism of claim 13, wherein the unlock driving mechanism further comprises a first dragging member, the unlock driving member has a first inclined surface, the sliding member has a second inclined surface, the first inclined surface abuts against the second inclined surface, the first dragging member is connected to the unlock driving member, and the first dragging member pulls the unlock driving member to drive the sliding member and the frame expansion locking member to slide together.

19. The frame locking mechanism of claim 18, wherein the unlock driving mechanism further comprises an unlock operating mechanism, the unlock operating mechanism is disposed on the handle, the first dragging member is connected to the unlock operating mechanism, and the unlock operating mechanism is operated to pull the first dragging member.

20. The frame locking mechanism of claim 13, wherein the frame locking mechanism further comprises a first elastic member for returning the frame expansion locking member, and the first elastic member is disposed between the rear foot and one of the frame expansion locking member and the sliding member.

21. The frame locking mechanism of claim 13, wherein the sliding member has a slot for receiving a pivot between the handle, the front foot and the rear foot.

22. The frame locking mechanism of claim 13, wherein a handle cover is disposed on an end of the handle, a front foot cover is disposed on an end of the front foot, a rear foot cover is disposed on an end of the rear foot, and the handle cover, the front foot cover and the rear foot cover are coaxially and pivotally connected to each other.

\* \* \* \* \*